US006652822B2

(12) United States Patent
Phillips et al.

(10) Patent No.: US 6,652,822 B2
(45) Date of Patent: Nov. 25, 2003

(54) SPHERICAL BORON NITRIDE PARTICLES AND METHOD FOR PREPARING THEM

(75) Inventors: Jonathan Phillips, Santa Fe, NM (US); Seth S. Gleiman, Santa Fe, NM (US); Chun-Ku Chen, Albuquerque, NM (US)

(73) Assignee: The Regents of the University of California, Los Alamos, NM (US)

( * ) Notice: Subject to any disclaimer, the term of this patent is extended or adjusted under 35 U.S.C. 154(b) by 172 days.

(21) Appl. No.: 09/860,016

(22) Filed: May 17, 2001

(65) Prior Publication Data

US 2002/0172635 A1 Nov. 21, 2002

(51) Int. Cl.$^7$ ............................................. C01B 21/064
(52) U.S. Cl. ..................... 423/290; 23/293 R; 23/313 R
(58) Field of Search ........................ 423/290; 23/293 R, 23/313 R

(56) References Cited

U.S. PATENT DOCUMENTS

| | | | |
|---|---|---|---|
| 4,689,075 A | 8/1987 | Uda et al. ................... | 75/0.5 B |
| 5,989,648 A | 11/1999 | Phillips ........................ | 427/456 |
| 6,348,179 B1 * | 2/2002 | Paine et al. .................. | 423/290 |

OTHER PUBLICATIONS

H. Shim et al., "Restructuring of Alumina Particles Using a Plasma Torch", J. Mat. Res., vol. 14, pp 849–854 (1999), (no month).

Chun–Ku Chen et al., "Low–power Plasma Torch Method for the Production of Crystalline Spherical Ceramic Particles," J. Mater. Res., vol. 6, No. 5, pp 1256–1265 (May 2001).

* cited by examiner

Primary Examiner—Wayne A. Langel
(74) Attorney, Agent, or Firm—Samuel L. Borkowsky

(57) ABSTRACT

Spherical and polyhedral particles of boron nitride and method of preparing them. Spherical and polyhedral particles of boron nitride are produced from precursor particles of hexagonal phase boron nitride suspended in an aerosol gas. The aerosol is directed to a microwave plasma torch. The torch generates plasma at atmospheric pressure that includes nitrogen atoms. The presence of nitrogen atoms is critical in allowing boron nitride to melt at atmospheric pressure while avoiding or at least minimizing decomposition. The plasma includes a plasma hot zone, which is a portion of the plasma that has a temperature sufficiently high to melt hexagonal phase boron nitride. In the hot zone, the precursor particles melt to form molten particles that acquire spherical and polyhedral shapes. These molten particles exit the hot zone, cool, and solidify to form solid particles of boron nitride with spherical and polyhedral shapes. The molten particles can also collide and join to form larger molten particles that lead to larger spherical and polyhedral particles.

85 Claims, 9 Drawing Sheets

Fig. 1

SPHERICAL BORON NITRIDE PARTICLES AND METHOD FOR PREPARING THEM

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to ceramics and more particularly, to spherical particles of boron nitride in the micron size range and to a method of preparing them.

BACKGROUND OF THE INVENTION

Epoxy filler is widely used in the production of chip mountings for integrated circuits packages. The filler is a mixture of thermally conductive particles that are added to an epoxy resin to produce a particle/resin mixture. Injection molding is the preferred process for forming chip mountings from the particle/resin mixture, which places constraints on the physical form of the particles used as filler for an efficient injection molding. In particular, flat or flaky particles tend to stack during injection molding. This stacking increases the viscosity of the mixture during injection molding, which can lead to the production of air spaces in the epoxy/particle mixture that remain after the mixture cures. Air is a poor conductor of heat, and air spaces in the chip mounting attenuate the thermal transfer properties of the resulting chip mounting. Spherical particle filler is preferred over flat and flaky filler since spherical particles do not stack during injection molding.

The present market for spherical ceramic particles is dominated by spherical silica ($SiO_2$) because silica spheres are available in a wide variety of sizes at low cost. However, the thermal conductivity, electrical conductivity, and other properties of silica are not optimal for chip mountings and other applications. Alumina ($Al_2O_3$) is preferred over silica since it has a higher thermal conductivity and a lower electrical conductivity. Importantly, alumina can also be produced in the form of micron-sized spherical particles (see, for example: H. Shim et al., "Restructuring of Alumina particles Using a Plasma Torch", *J. Mat. Res.*, volume 14, page 849 (1999); C-K Chen et al. J. Mat. Res., vol. 16, p. 1256, (2001); U.S. Pat. No. 5,989,648 to J. Phillips entitled "Plasma Generation of Supported Metal Catalysts," issued on Nov. 23, 1999; and U.S. patent application Ser. No. 09/637,172, to Phillips et al., all incorporated by reference herein).

The current belief is that the heat transfer properties of a chip mounting depend significantly on the thermal conductivity of the filler particles used. Boron nitride (BN) has the highest thermal conductivity of any known non-electrically conductive ceramic. If spherical particles of BN of the appropriate size could be made at a reasonable cost, they would likely replace spherical silica or spherical silica and/or spherical alumina for at least some applications, such as for filler for integrated circuit packages. Thus, there is a need for spherical crystalline or at least partially crystalline particles of BN in the micron size range. However, no such method has yet been reported.

Therefore, an object of the present invention is to provide a method for generating spherical particles of boron nitride in the micron size range Another object of the present invention is to provide spherical particles of boron nitride in the micron size range.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a method for producing crystalline or partially crystalline particles of boron nitride, comprising the steps of generating an aerosol comprising precursor particles of boron nitride suspended in an aerosol gas; generating a plasma from a plasma gas, the plasma comprising nitrogen atoms, the plasma including a plasma hot zone having a temperature sufficiently high to melt boron nitride; directing the aerosol into the plasma hot zone and allowing the precursor particles of boron nitride to melt; and allowing the molten particles to exit the hot zone, whereby they cool and solidify to form crystalline or partially crystalline product particles of boron nitride.

The invention also includes a method for generating larger particles of boron nitride from smaller particles of boron nitride, comprising the steps of generating an aerosol comprising precursor particles of boron nitride suspended in an aerosol gas; generating a plasma from a plasma gas, the plasma comprising nitrogen atoms, the plasma including a plasma hot zone having a temperature sufficiently high to melt boron nitride; directing the aerosol into the plasma hot zone and allowing the precursor particles of boron nitride to melt, collide, and join to form larger particles; and allowing the molten particles to exit the hot zone, whereby they cool and solidify to form solid particles of boron nitride that are larger than the precursor particles.

The method also includes a method for melting boron nitride, comprising the steps of generating a plasma comprising nitrogen atoms, the plasma including a plasma hot zone having a temperature sufficiently high to melt hexagonal phase boron nitride; and exposing precursor particles of boron nitride to the plasma, whereby boron nitride melts.

The invention also includes crystalline or partially crystalline boron nitride particles made by the process comprising the steps of generating an aerosol comprising precursor particles of boron nitride suspended in an aerosol gas; generating a plasma from a plasma gas, the plasma comprising nitrogen atoms, the plasma including a plasma hot zone having a temperature sufficiently high to melt boron nitride; directing the directing the aerosol into the plasma hot zone and allowing the precursor particles of boron nitride to melt; and allowing the molten particles to exit the hot zone, whereby they cool and solidify to form crystalline or partially crystalline solid particles of boron nitride.

The invention also includes crystalline or partially crystalline boron nitride particles made by the method comprising the steps of generating an aerosol comprising precursor particles of boron nitride suspended in an aerosol gas; generating a plasma from a plasma gas, the plasma comprising nitrogen atoms, the plasma including a plasma hot zone having a temperature sufficiently high to melt boron nitride but not high enough to decompose the boron nitride; directing the aerosol into the plasma hot zone and allowing the precursor particles of boron nitride to melt, collide, and join to form larger particles; and allowing the molten particles to exit the hot zone, whereby they cool and solidify to form crystalline or partially crystalline solid particles of boron nitride that are larger than the precursor particles.

The invention also includes crystalline or partially crystalline spherical particles of boron nitride having a diameter of about 1–1000 microns.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings:

Figure 1:
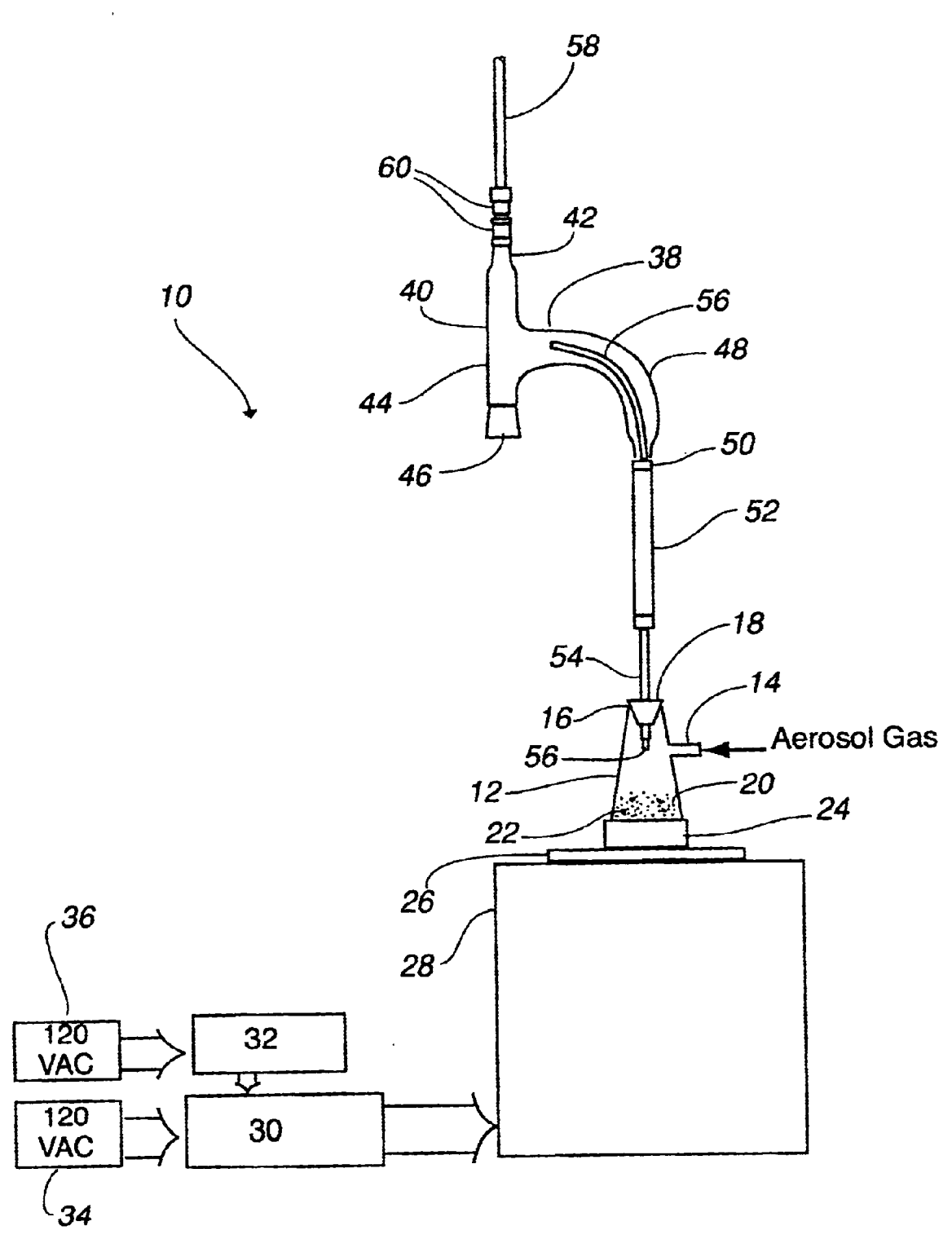

FIG. 1 shows a schematic representation of a particle feeder that produces a BN particle aerosol and delivers it to a plasma torch;

DETAILED DESCRIPTION OF THE INVENTION

Figure 2:
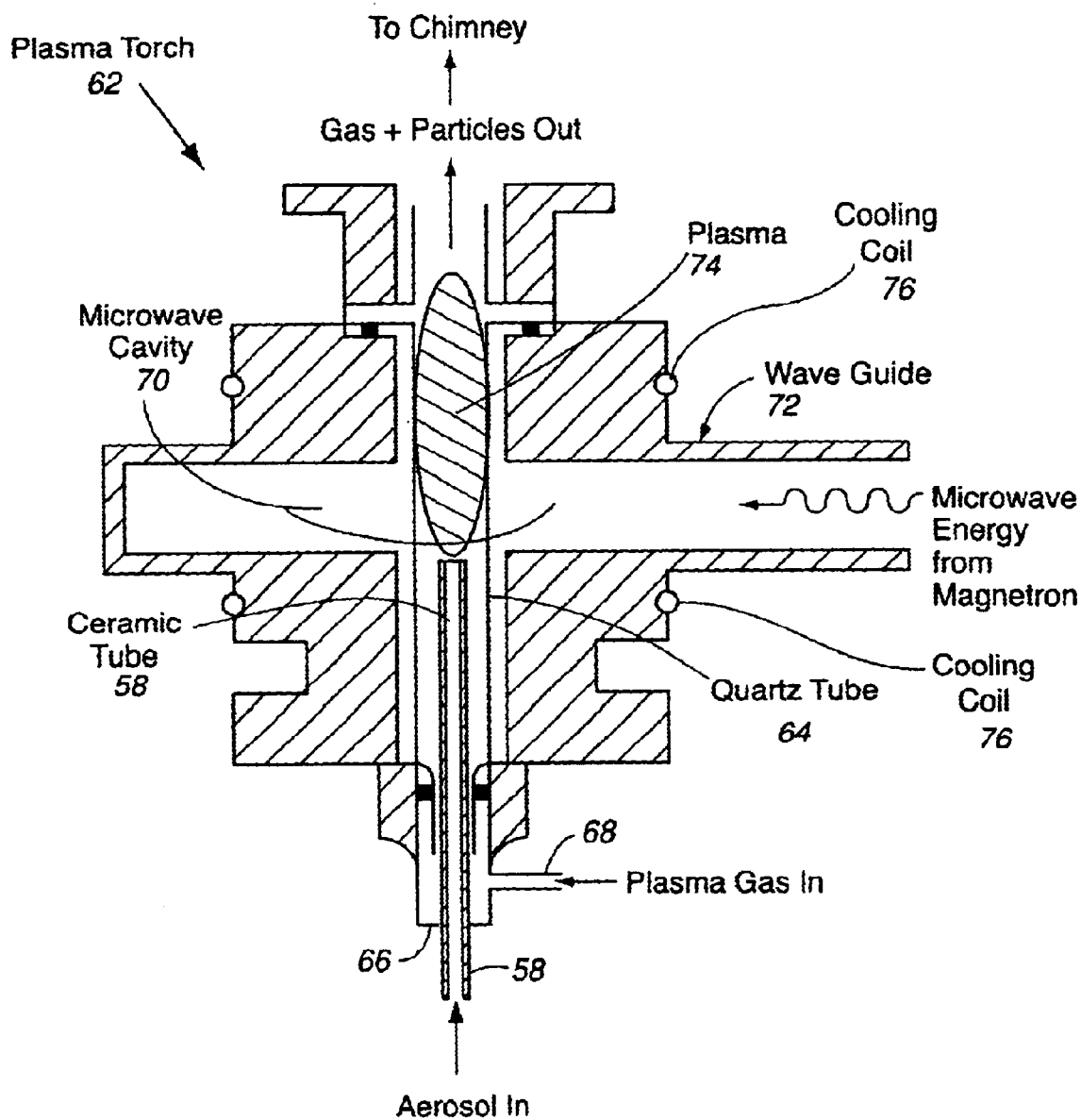
FIG. 2 shows a schematic, cross-sectional representation of a microwave plasma torch.
Figure 3:
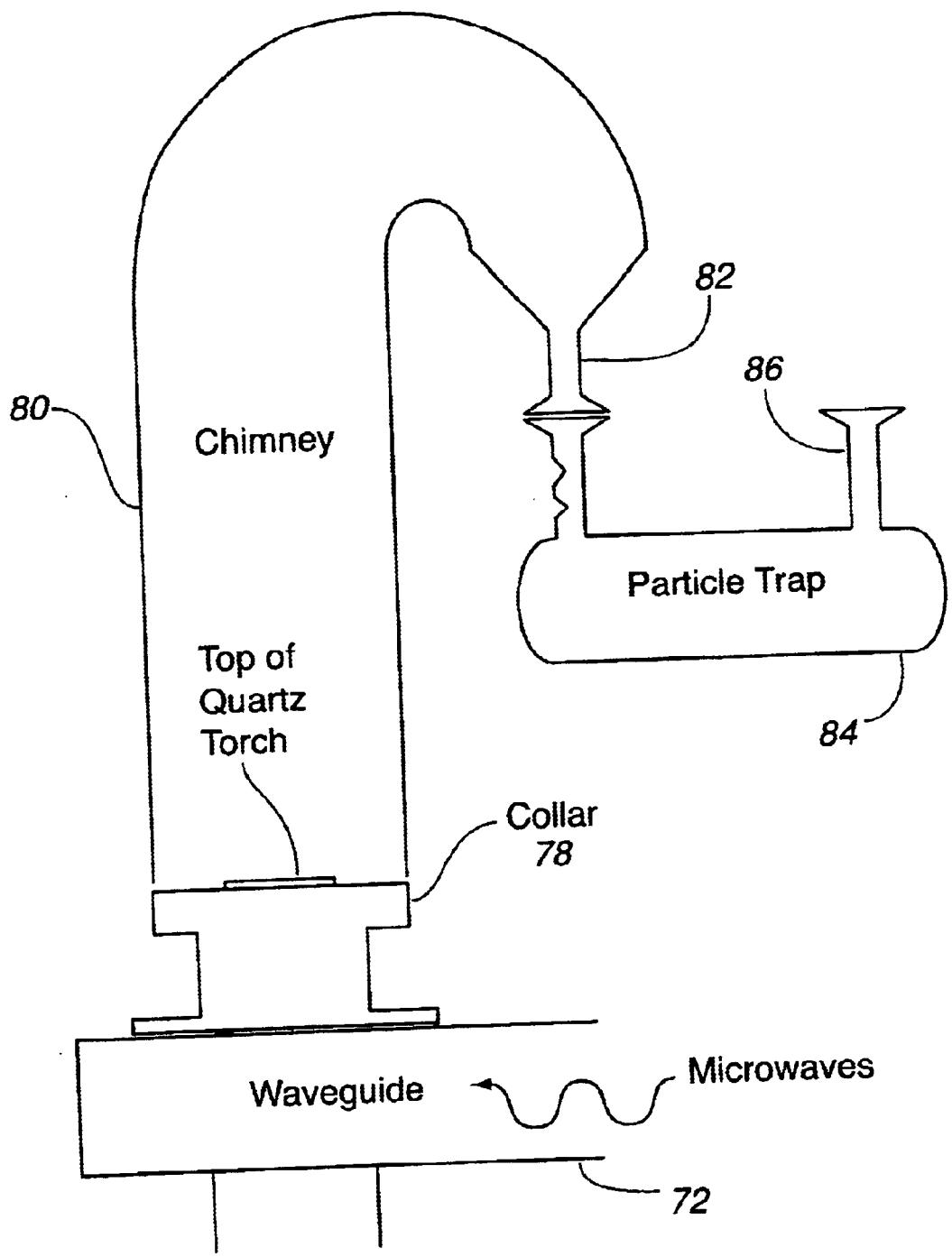
FIG. 3 shows a schematic representation of a product particle collector.
Figure 4:
FIG. 4 shows a scanning electron micrograph of precursor platelet-shaped boron nitride used to demonstrate the invention.
Figure 6:
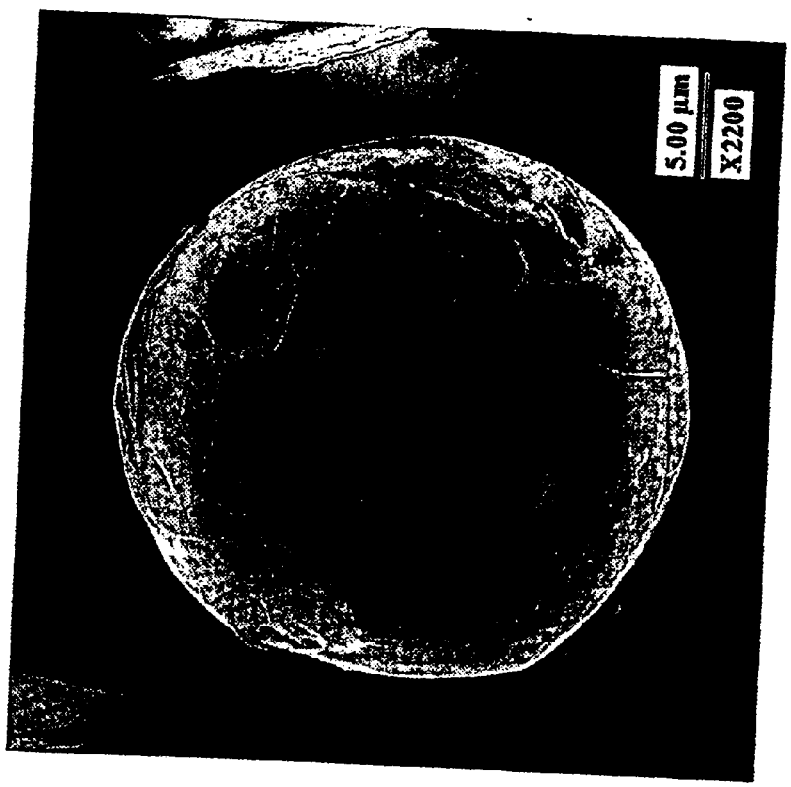
FIG. 6, shows a scanning electron micrograph of a spherical crystalline hexagonal BN particle of the present invention.
Figure 5:
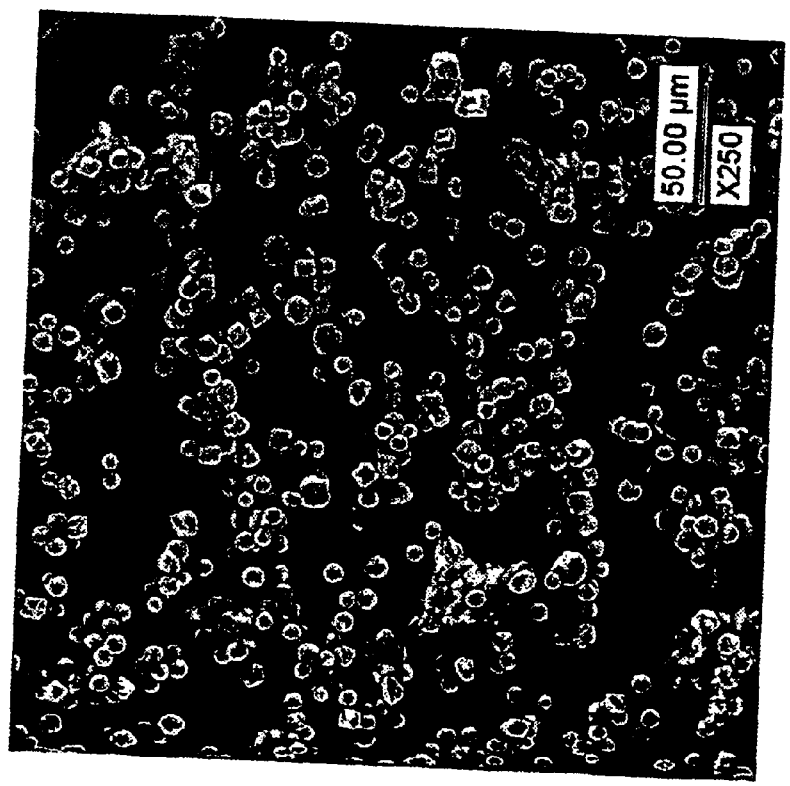
FIG. 5 shows a scanning electron micrograph of spherical crystalline hexagonal phase, BN product particles produced according to the present invention.

It is generally accepted that BN cannot be heated to melting at atmospheric pressure. Previous attempts to melt BN at atmospheric pressure result in decomposition according to the equation below:

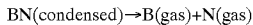
BN(condensed)→B(gas)+N(gas)

According the present invention, BN can be melted at atmospheric pressure when heated in a nitrogen-atom rich environment. If BN decomposes into boron and nitrogen during heating, it is reformed in the nitrogen-rich environment according to the following equation, which is a reverse of the above equation.

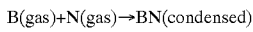
B(gas)+N(gas)→BN(condensed)

Furthermore according to the invention, if particles of BN are allowed to melt and become fully molten, they acquire a spherical shape. If melting is incomplete, the BN precursor particles form irregularly shaped product particles. In addition, molten or partially molten particles formed during heating may collide and join together to produce larger particles, also with these spherical and irregular shapes.

A number of different forms of BN precursor particles can be used with the invention. They can be, for example, crystalline or noncrystalline. Of the crystalline forms, they can be platelets, which are commercially available. They can also be the spherical precursors, which include the product particles formed by the present invention. Non-crystalline or partially crystalline precursors include particles of amorphous boron nitride.

The apparatus used to demonstrate the invention includes a particle feeder that was used to generate a BN precursor particle aerosol, a microwave torch used to melt the precursor particles, and a particle collector used to collect the product BN particles. Plasma gas flows through the torch, and microwave energy ignites the plasma gas to form a plasma. Aerosol gas flowing through a reservoir of precursor BN particles suspends the particles and transports them to the plasma. The precursor particles melt as they move through the plasma hot zone, i.e. that portion of the plasma sufficiently hot to melt BN. If melting is complete, the molten particles become spherical. Molten or partially molten particles can also collide and join to form larger particles. Surprisingly, in some cases, product particles with polyhedral, e.g. with an octahedral particle morphology, are also recovered.

The plasma must include nitrogen atoms in order for melting to occur. Preferably, the plasma is rich in nitrogen atoms. This nitrogen rich plasma is most easily formed using a microwave torch apparatus by first forming a nitrogen-free plasma that is generated by introducing argon gas into the torch and igniting the argon gas to form a substantially nitrogen-free argon plasma. Afterward, the plasma gas composition is adjusted by introducing nitrogen gas into the plasma gas stream. Nitrogen-rich plasma need not contain only nitrogen or even a majority of nitrogen but should include a sufficient amount so that BN can melt without noticeable decomposition. While the melting process appears to work best when the plasma gas composition includes about 50–100% of nitrogen, it is expected that gas compositions that include as little as 5% nitrogen would also produce a plasma that could be used to melt BN according to the invention.

The practice of the invention can be further understood with the accompanying figures, which include representations of the apparatus used to demonstrate the invention and photomicrographs of spherical and polyhedral product particles of BN. Similar or identical structure is identified using identical callouts. Parts of the apparatus have already been described in aforementioned H. Shim et al *J. Mat Res.*, vol. 14, p 849 (1999), C-K Chen et al. J. Mat. Res., vol. 16, p. 1256, (2001), U.S. Pat. No. 5,989,648, and in U.S. patent application Ser. No 09/637,172.

Turning now to the figures, the apparatus used to melt BN includes particle feeder 10, shown in FIG. 1. It should be understood that the main purpose of a particle feeder is to provide a BN particle aerosol of a controlled particle density and to deliver the particle aerosol at a controlled rate to a plasma. Any particle feeder capable of doing this could be used. With this in mind, an inexpensive particle feeder was constructed using parts commonly found in a laboratory. Particle feeder 10 includes particle reservoir 12 with aerosol gas inlet 14 and aerosol gas outlet 16. Outlet 16 is partially blocked with one-hole stopper 18. Reservoir 12 contains platelet shaped precursor BN particles 20 and dispersing agents 22. Dispersing agents 22 are larger and heavier than particles 20 and are included in the reservoir for the purposes of dispersing the BN powder and removing any powder that adheres to the inner walls of the reservoir. Dispersing agents 22 in the form of cross-disks can be made by cutting along the radii of small (ca. 10 mm in diameter) aluminum disks and then interconnecting pairs of disks to form cross-disks. Reservoir 12 rests atop and is fastened to dish 24, which rests atop diaphragm 26. Diaphragm 26 is attached to diaphragm support 28. In practice, an audio speaker provided diaphragm 26 and a ported speaker box provided support 28. Diaphragm 26 can be made to oscillate vertically using audio amplifier 30, which amplifies a signal generated by signal generator 32. Amplifier 30 and signal generator 32 were powered by power sources 34 and 36 respectively.

Particle feeder 10 also includes particle trap 38 positioned above and in alignment with reservoir 12. Trap 38 has an inverted y-shape with an inline tubular portion 40 having an upper opening 42 and a lower opening 44. Removable sealing member 46 seals lower opening 44. Trap 38 also includes side tubular portion 48 attached to a side of and in fluid communication with inline tubular portion 40. Side tubular portion 48 curves downward so that the open end 50 of side tubular portion 48 is in alignment and substantially coaxial with the hole in the one hole stopper 18. Particle feeder 10 also includes a flexible tube 52 and a more rigid outer support tube 54. The upper end of tube 52 sealingly engages open end 50 of side tube portion 48. The lower end of flexible tube 52 sealingly engages the upper end of outer support tube 54. The lower end of support tube 54 is inserted through the hole in one-hole stopper 18 and is in compressive engagement with the stopper. Particle feeder 10 also includes a flexible inner flow tube 56. Flow tube 56 is supported by support tube 54 and extends within particle feeder 10 from reservoir 12 through support tube 54 and through side tube portion 48 until almost reaching inline tube portion 40. Flow tube 56 directs aerosol out of the reservoir to inline portion 40, and also performs a particle size separator function by not permitting particles larger than the inner diameter of the flow tube to enter the flow tube. These include dispersing agents 22, and larger particles of BN that may be difficult to melt completely. The larger BN particles could also be filtered away before charging particle reservoir 12. Particle feeder 10 may also include a particle inlet (not shown) for introducing fresh BN precursor as it is being removed from the reservoir and subsequently converted into product, thereby enhancing production efficiency.

Particle feeder 10 also includes a ceramic tube 58. The lower end of ceramic tube 58 is connected to the upper end 42 of inline portion 40 of particle trap 38 with connector 60. The upper end of ceramic tube 58 is directed toward the plasma generated by plasma torch 62, a schematic cross-sectional representation of which is shown in FIG. 2.

Turning now to FIG. 2, ceramic tube 58 passes through coaxial outer quartz tube 64 and seals against the lower end 66 of quartz tube 64. A non-aerosol-containing stream of plasma gas enters lower end 66 of quartz tube 64 through inlet 68. The upper end of ceramic tube 58 extends into microwave cavity 70, where the aerosol stream and plasma gas stream converge. Microwave energy generated by a magetron (not shown) is directed through waveguide 72 into microwave cavity 70 where it interacts with the combined gas streams inside cavity 70 and transforms the gas into plasma 74. Cooling coils 76 surrounding torch 62 are provided with flowing cooling water to remove excess heat from the torch.

In practice, argon plasma gas is ignited by microwave energy to form a substantially nitrogen-free plasma. Nitrogen gas is then blended into the plasma gas stream. The plasma gas composition can be one of pure nitrogen, or of nitrogen-containing mixtures. After a desired gas composition is attained, reservoir 12, shown in FIG. 1, is made to oscillate vertically according to, for example, a sine waveform of predetermined frequency and amplitude. As reservoir 12 oscillates vertically, BN particles 20 inside the reservoir disperse and take on a cloudy appearance while dispersing agents 22 aid in preventing particles 20 from adhering to each other and to the inner walls of reservoir 12. Aerosol gas enters particle reservoir 12 through inlet 14 and combines with the BN particles inside to produce a BN particle aerosol that flows out of reservoir 12 through flow tube 56. Particles exit flow tube 56 and enter inline portion 40 of particle trap 38. Some of the heavier particles fall toward stopper 46 where they are later removed. Most particles are carried with the aerosol gas upward and out of particle trap through ceramic tube 58 to plasma torch 62, where they continue to flow upward and through plasma 74. They pass through the hot zone of the plasma, where they melt and acquire a spherical shape. Molten or partially molten particles can also collide with other such particles and join with them to form larger particles that can continue to melt to form larger spheres.

After exiting the hot zone, the molten particles rapidly cool and solidify as they flow through collar 78, shown in FIG. 3, and into chimney 80. They exit chimney 80 through connecting tube 82 and into particle trap 84 where they are collected. Plasma gas is vented out of particle trap 84 through exit port 86.

A scanning electron micrograph of the precursor BN particles used to demonstrate the present invention is shown in FIG. 4. FIG. 5 shows a scanning electron micrograph (SEM) of spherical BN particles formed from these precursor BN particles and FIG. 6 shows a scanning electron micrograph of a single spherical particle. While these micrographs particularly show the changes in shape between the precursor and product, one would conclude that they were at least different from a simple visual comparison of the precursor and product particles. In contrast to the precursor particles, the product particles were darker (grey to black) and flowed more easily.

The output spherical product BN particles recovered were generally as large or larger than the input precursor BN platelets. Seldom, if ever, were particles recovered with sizes much smaller than the sizes of the precursor particles. From this observation, it is believed that any role BN decomposition may play in affecting the sizes of BN product particles formed from a nitrogen atom containing plasma environment is likely only a minor one.

Ultra-high purity nitrogen gas was used. Attempts to generate nitrogen plasma from pure nitrogen gas were unsuccessful. To generate pure-nitrogen plasma, an argon plasma gas stream was introduced into the microwave plasma torch. The argon gas was ignited to form an argon plasma. Then, a nitrogen plasma gas stream was gradually introduced into the argon plasma while the argon plasma gas stream flow was reduced. This method can be used to produce plasmas containing about 5–100% nitrogen and 95–0% argon.

Cooling water at about 5–10° C. was circulated throughout the plasma torch system so that the system could be operated continuously without overheating. Also, a gas handling system was employed to vent the plasma exhaust gas. Particle recovery rates from the trap increased when a liquid such as ethanol was used as a trapping medium.

The product BN particle sizes varied according to the applied microwave power. Preferably, about 300–1200 Watts of applied microwave power was used to form and maintain the microwave plasma. Attempts at using power levels below 300 Watts produced an unstable nitrogen-containing plasma while increasing the power to levels above 1200 Watts resulted in the torch quickly overheating. It should also be understood that while the description throughout refers to the use of microwave-generated nitrogen plasma, other types of electromagnetic energy that can generate nitrogen atoms at a sufficiently high temperature to melt BN may also be used. Sources of radiofrequency (RF) energy, or that produce a DC discharge, for example, can also be used instead of microwaves.

The product BN particle sizes also varied according to the compositions of the aerosol and plasma gases, and according to the flow rates of these gases (the flow rates largely determine the residence time of BN particles in the hot zone of the plasma). The nitrogen gas flow was adjusted, for example, to provide a plasma gas flow of about 1.4–3.0 standard liters per minute (slpm). The density of precursor particles in the aerosol gas was controllable by adjusting the flow rate of aerosol gas and the oscillation amplitude of the particle reservoir. Increasing the oscillation amplitude increases the precursor particle density in the aerosol. It is believed that the final size of the spherical particles depends on the amount of agglomeration and/or Ostwald ripening that occurs in the hot zone of the plasma, which depend on combinations of these parameters.

Figure 7A:
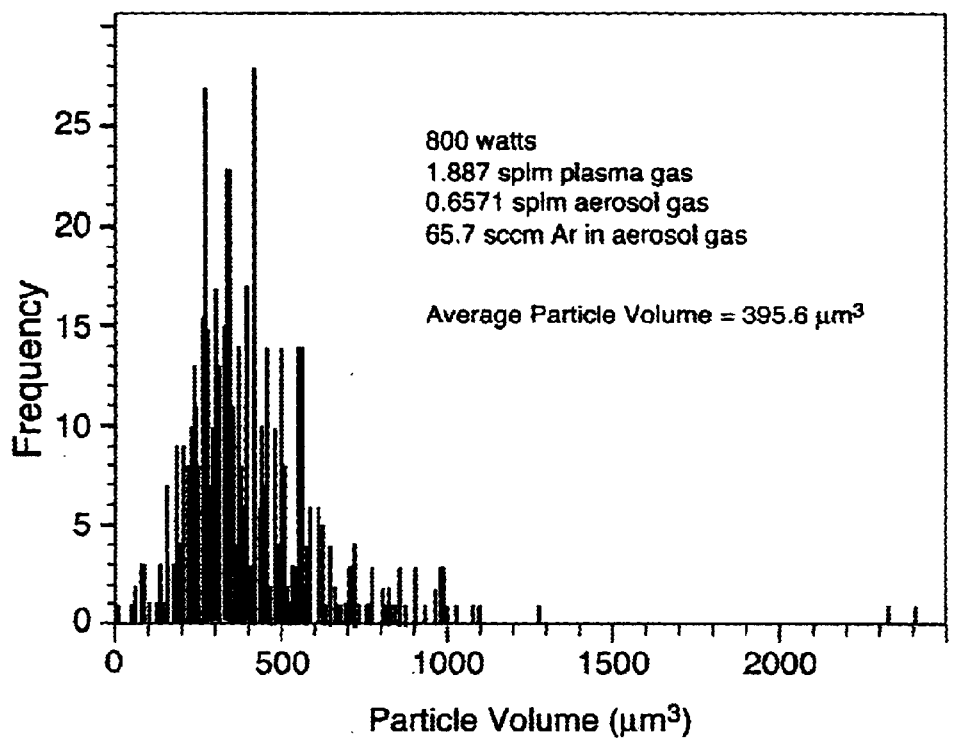
FIGS. 7a–e shows histograms that demonstrate how the average particle size of spherical BN particles produced according to the invention is affected by changes in the operating microwave power, aerosol gas flow rate, and plasma gas flow rate; and FIG. 8
Figure 7B:
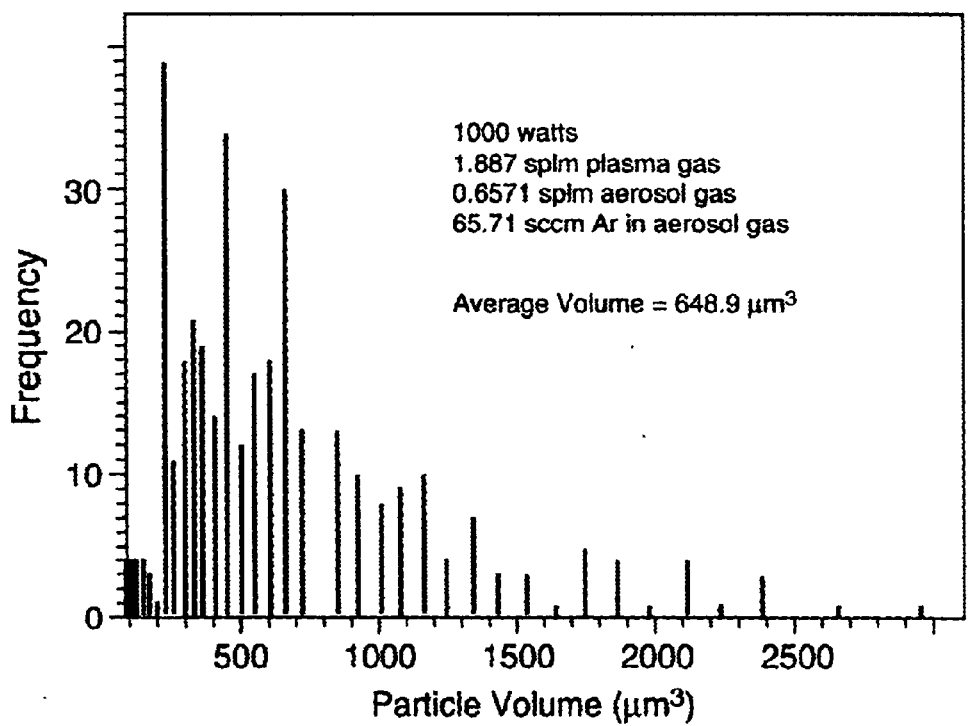
Figure 7C:
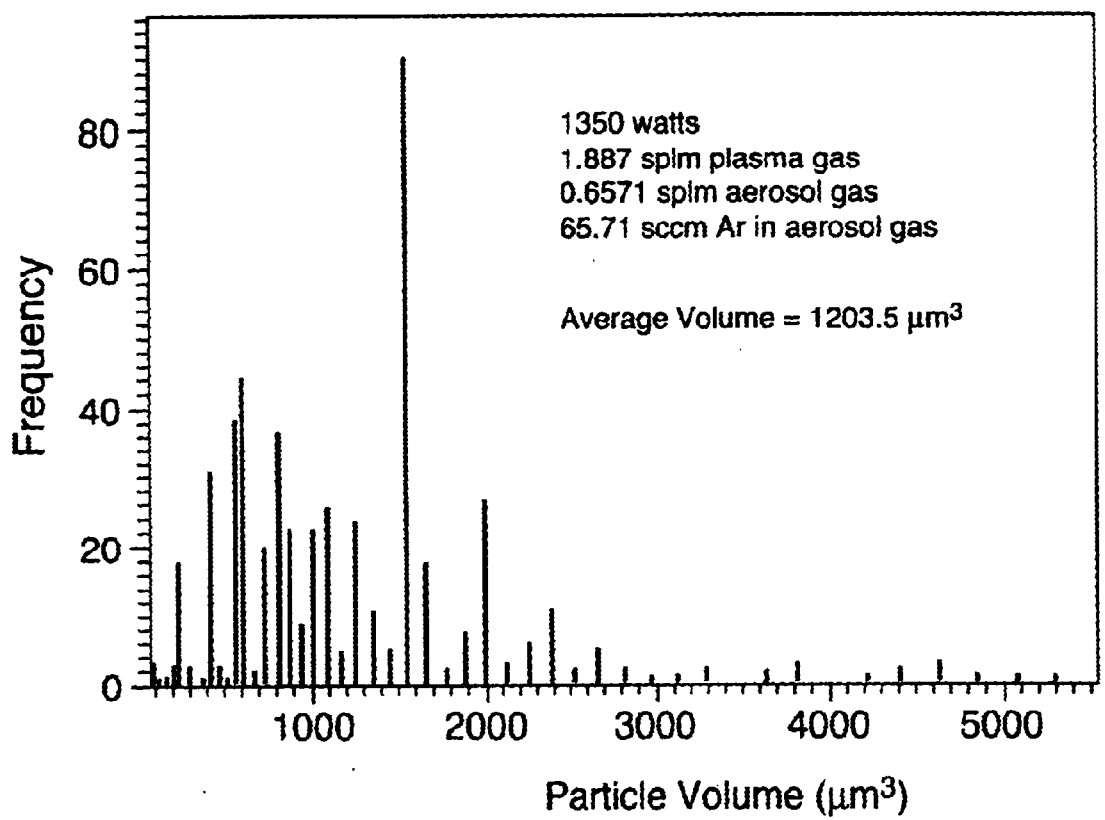

FIGS. 7a–e show histograms that demonstrate how the average particle size, reported as the average particle volume in cubic micrometers ($\mu m^3$) of spherical BN particles produced according to the invention is affected by changes in the operating microwave power, aerosol gas flow rate, and plasma gas flow rate. For these histograms, platelet BN particles having a volume average of about 85 $\mu m^3$ was used. In all cases, the plasma gas was nitrogen gas. The aerosol gas was about 90–100% nitrogen gas and about 0–10% argon gas. FIG. 7a shows a histogram of the particle volume distribution of the product BN particles for a microwave power of 800 Watts, a plasma gas flow rate of 1.887 splm, and an aerosol gas flow rate of 0.6571 slpm. The particle produced had an average volume of 395.6 $\mu m^3$. FIG. 7b shows a histogram of the particle size distribution for product BN particles with all parameters unchanged except for the microwave power, which was increased from 800 Watts to 1000 Watts. As FIG. 7b shows, with this increase in microwave power, the average particle volume increased from 395.6 $\mu m^3$ to 648.9 $\mu m^3$. The histogram shown in FIG. 7c shows that when the applied power is increased further to 1350 $\mu m^3$, the average particle volume increases further to 1203.5 $\mu m^3$.

Figure 7D:
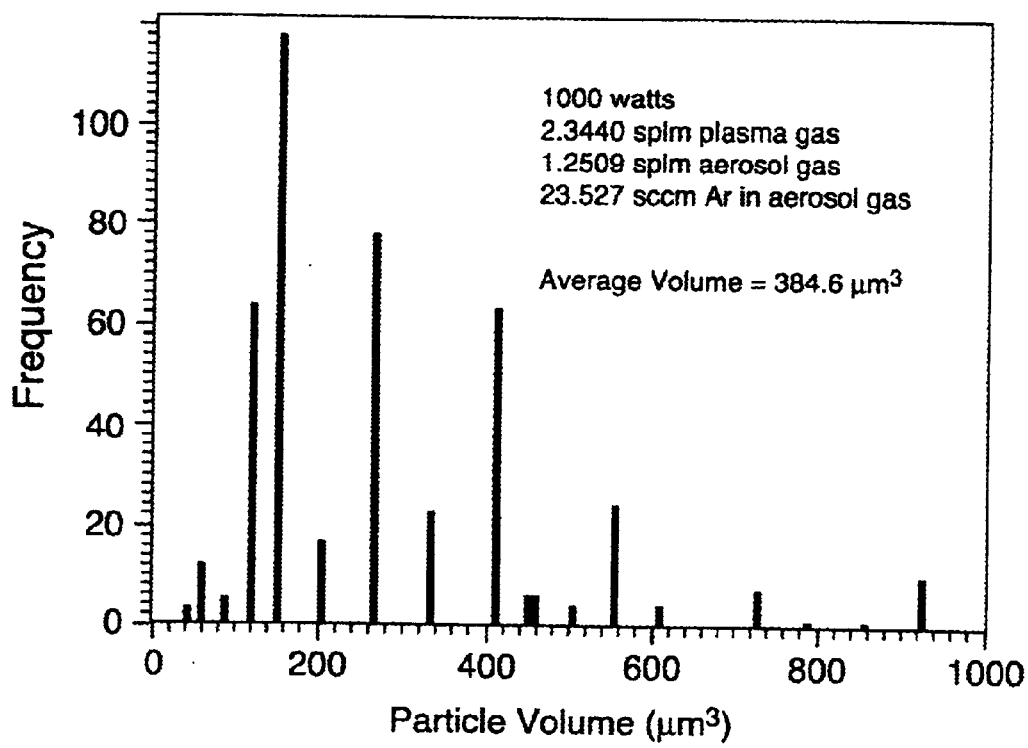
Figure 7E:
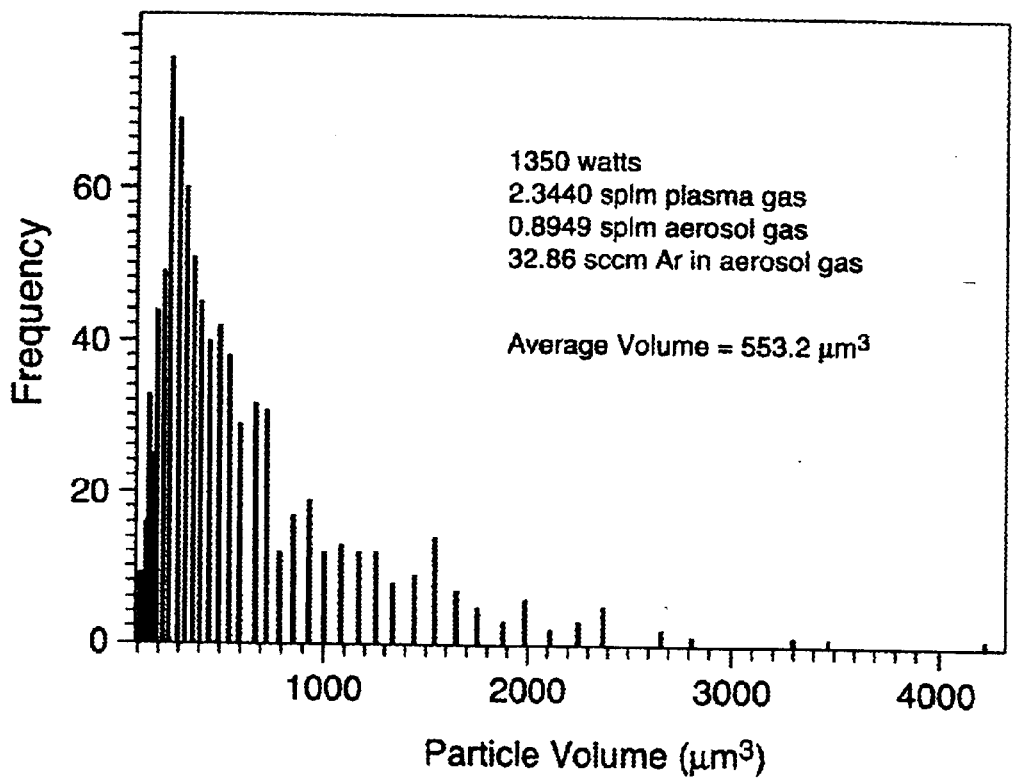

A comparison of the histograms of FIG. 7b and FIG. 7d, and separately a comparison of the histograms of 7c and 7e, show how the average particle size is affected by changes in the flow rates of the plasma gas and aerosol gas. Turning first to FIGS. 7b and 7d, both use a microwave power of 1000 Watts but the flow rates for the plasma gas and aerosol gas both increase in going from FIG. 7b to FIG. 7d, specifically from 1.887 to 2.3440 splm for the plasma gas, and from 0.6571 to 1.2509 for the aerosol gas. These changes resulted in a decrease in particle volume from 648.9 $\mu m^3$ to 384.6 $\mu m^3$. Turning to FIGS. 7c and 7e for a similar comparison, both use a microwave power of 1350 Watts but the flow rates of the plasma gas and aerosol gas increase from FIG. 7c to FIG. 7e, specifically from 1.887 to 2.344 slpm for the plasma gas and from 0.6571 to 0.8949 splm for the aerosol gas. These changes resulted in a decrease in particle volume from 1205.5 to 553.2 $\mu m^3$.

The following model is proposed to explain the production of spherical BN particles from non-spherical precursor particles. Platelet-shaped particles of hexagonal phase boron nitride (hBN) are introduced into the plasma. The precursor particles melt as they pass through the plasma hot zone. As the particles continue to melt, they form spheres that pass into the cooler plasma afterglow region where they cool and solidify. Faster flow rates result in lower residence time in the plasma 'hot zone'. The number of collisions between particles in the plasma that result in agglomeration is proportional to the amount of time in the hot zone. Thus, faster flow rates result in fewer collisions and hence smaller output particles. This model is consistent with the above described impact of flow rate changes on average particle size.

Figure 9:
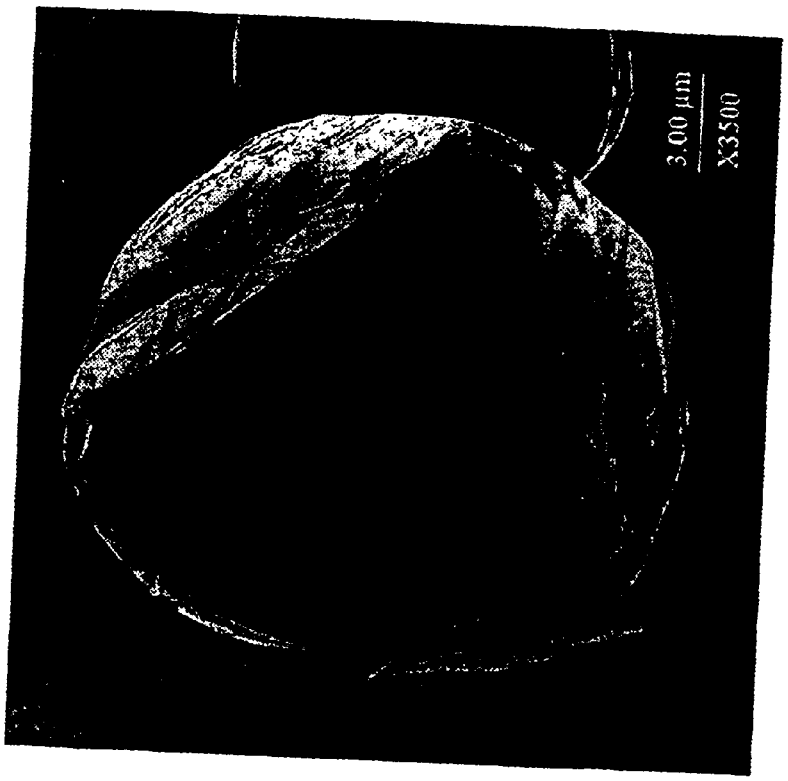
FIG. 9 shows a scanning electron micrograph of polyhedral BN produced according to the present invention.
Figure 8:
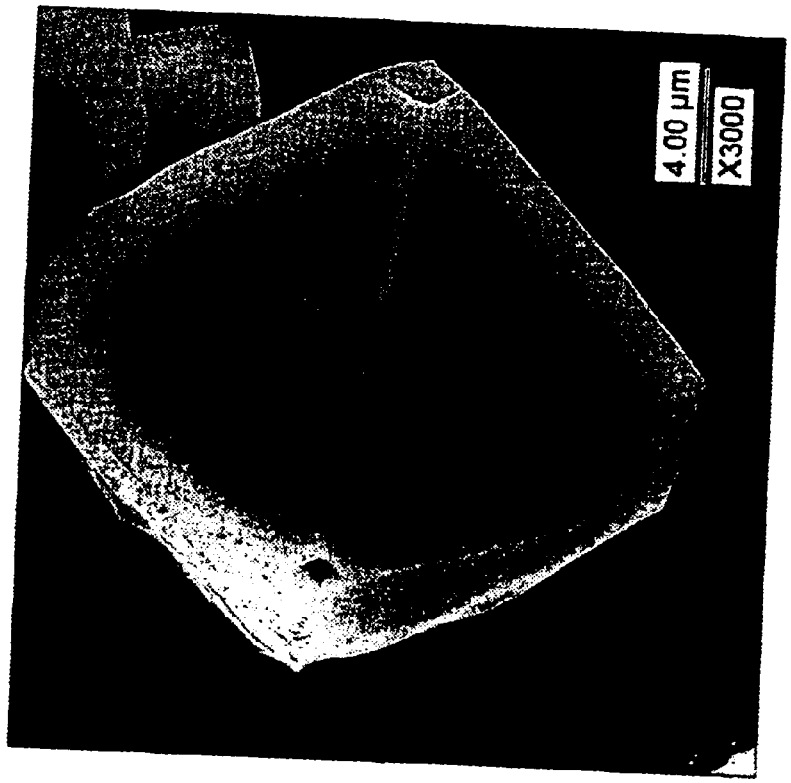

The recovery of product BN particles with polyhedral morphologies was surprising. FIG. 8 and FIG. 9 show scanning electron micrographs of product BN particles with an octahedral morphology that were recovered with spherical particles. They were examined by Transmission Electron Microscopy Selective Angle Diffraction. Results suggest that they were also hexagonal phase. Although cubic phase polyhedral BN particles have been known for years, there have been no previous reports of hexagonal phase, polyhedral BN particles.

Powder x-ray diffraction of powdered samples containing about 10–15% of the polyhedral product also failed to detect any BN phase other than hexagonal phase. Although no spectroscopic evidence indicating the presence of cubic phase BN, physical evidence that may indicate at least the formation of a cubic phase. Firstly, the habit of a polyhedral particle suggests that it must have a cubic phase. Secondly, many of the polyhedral particles recovered were hollow or had truncated corners, which are the expected features of a solid particle after it undergoes the volume shrinking that accompanies a phase change from a less dense phase to a more dense phase. Hexagonal phase BN is significantly less dense than cubic phase BN, and a molten BN drop derived from precursor hexagonal phase BN particle would shrink significantly to form cubic phase BN.

Thus, while spectroscopic evidence indicates that the polyhedral particles are hexagonal phase, the physical appearance of the particles suggests otherwise, that they have a cubic phase. The following mechanism is proposed to explain the formation of cubic phase polyhedral BN particles. Initially, hexagonal phase precursor platelets melt and minimize surface tension by forming spheres. Having no solid phase, the molten particles crystallize into either of the two known solid phases, the hexagonal solid phase or the cubic solid phase. Most are recovered as spherical particles in the hexagonal solid phase. However, some aspect of the melting and solidification process, such as the presence of impurities or the precise cooling rate, favors "freezing" in the cubic phase for some of the particles.

The resulting BN is "softer" than many other widely used ceramics such as alumina or silica. Hard ceramic alumina or silica particles tend to scratch the dies, molds, and other devices used during extrusion processing and injection molding, which increases the cost of repairing and maintaining these devices. Softer BN particles could be processed via injection molding with less wear on the molding apparatus. Furthermore, we have developed a mathematical model demonstrating that the thermal transfer properties of a device such as a chip mounting produced using an epoxy/particle resin may be affected to a significant degree by the amount of surface contact between filler particles in the resin. In particular, it can be shown that an increase in the surface contact between filler particles improves thermal transfer. While harder spherical particles such as silica and alumina provide minimal point contact, softer spherical and polyhedral BN filler particles offer not only an improvement in thermal conductivity but also an increased surface contact between particles. This increased surface contact may lead to even further improvements in thermal transfer properties of the resulting chip mounting.

The foregoing description of the invention has been presented for purposes of illustration and description and is not intended to be exhaustive or to limit the invention to the precise form disclosed, and obviously many modifications and variations are possible in light of the above teaching. Commercially available particle feeders, for example, could be used instead of the particle feeder described herein.

The embodiment(s) were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for producing crystalline or partially crystalline particles of boron nitride (BN), comprising the steps of:
   (a) generating an aerosol comprising precursor particles of boron nitride (BN) suspended in an aerosol gas;
   (b) generating a plasma from a plasma gas, the plasma comprising nitrogen atoms, the plasma including a plasma hot zone having a temperature sufficiently high to melt boron nitride;
   (c) directing the aerosol into the plasma hot zone and allowing the precursor particles of boron nitride to melt; and
   (d) allowing the molten particles to exit the hot zone, whereby they cool and solidify to form crystalline or partially crystalline product particles of boron nitride.

2. The method of claim 1, where the plasma is generated from plasma gas at a gas pressure of about 0.01–100 atmospheres.

3. The method of claim 1, wherein the plasma is generated from plasma gas at a pressure of about 1 atmosphere.

4. The method of claim 1, wherein the plasma is generated by a DC discharge.

5. The method of claim 1, wherein the plasma is generated by supplying electromagnetic energy to the plasma gas.

6. The method of claim 5, wherein the plasma is generated using radiofrequency energy.

7. The method of claim 5, wherein the plasma is generated using microwave energy.

8. The method of claim 7, wherein the plasma is generated using about 300–30,000 watts of microwave power.

9. The method of claim 8, wherein the plasma is generated using about 300–1200 watts of power.

10. The method of claim 1, wherein the plasma comprising nitrogen atoms is generated by first producing argon plasma from argon plasma gas and then introducing nitrogen plasma gas into the argon plasma.

11. The method of claim 1, wherein the plasma gas comprising nitrogen atoms is produced from a plasma gas stream mixture comprising about 95–0% argon gas and about 5–100% nitrogen gas.

12. The method of claim 1, wherein the precursor boron nitride particles comprise hexagonal solid phase boron nitride.

13. The method of claim 1, wherein the precursor boron nitride particles comprise platelet-shaped particles.

14. The method of claim 1, wherein the precursor boron nitride particles comprise spherical particles.

15. The method of claim 1, wherein the precursor boron nitride particles comprise agglomerates.

16. The method of claim 1, wherein the solid particles recovered in step (d) comprise spherical shaped particles with a diameter of about 1–1000 microns.

17. The method of claim 1, wherein the solid particles recovered in step (d) comprise polyhedral shaped particles.

18. A method for generating larger particles of boron nitride from smaller particles of boron nitride, comprising the steps of:
   (a) generating an aerosol comprising precursor particles of boron nitride suspended in an aerosol gas;
   (b) generating a plasma from a plasma gas, the plasma comprising nitrogen atoms, the plasma including a plasma hot zone having a temperature sufficiently high to melt boron nitride;
   (c) directing the aerosol into the plasma hot zone and allowing the precursor particles of boron nitride to melt, collide, and join to form larger particles; and
   (d) allowing the molten particles to exit the hot zone, whereby they cool and solidify to form solid particles of boron nitride that are larger than the precursor particles.

19. The method of claim 18, where the plasma is generated from plasma gas at a gas pressure of about 0.01–100 atmospheres.

20. The method of claim 18, wherein the plasma is generated from plasma gas at a pressure of about 1 atmosphere.

21. The method of claim 18, wherein the plasma is generated by a DC discharge.

22. The method of claim 18, wherein the plasma is generated by supplying electromagnetic energy to the plasma gas.

23. The method of claim 18, wherein the plasma is generated using radiofrequency energy.

24. The method of claim 23, wherein the plasma is generated using microwave energy.

25. The method of claim 24, wherein the plasma is generated using about 300–30,000 watts of microwave power.

26. The method of claim 25, wherein the plasma is generated using about 300–1200 watts of power.

27. The method of claim 18, wherein the plasma comprising nitrogen atoms is generated by first producing an argon plasma from argon plasma gas and then introducing nitrogen plasma gas into the argon plasma.

28. The method of claim 18, wherein the plasma gas comprising nitrogen atoms is produced from a plasma gas stream mixture comprising about 95–0% argon gas and about 5–100% nitrogen gas.

29. The method of claim 18, wherein the precursor boron nitride particles are in the hexagonal solid phase.

30. The method of claim 18, wherein the precursor boron nitride particles are platelet-shaped.

31. The method of claim 18, wherein the precursor boron nitride particles are spherical shaped.

32. The method of claim 18, wherein the precursor boron nitride particles comprise agglomerates.

33. The method of claim 18, wherein the solid particles recovered in step (d) comprise spherical shaped particles with a diameter of about 1–1000 microns.

34. The method of claim 18, wherein the solid particles recovered in step (d) comprise polyhedral shaped particles.

35. The method of claim 18, wherein the solid particles recovered in step (d) comprise agglomerates arising from the joining of partially melted BN particles.

36. A method for melting boron nitride (BN), comprising the steps of:

(a) generating a plasma comprising nitrogen atoms, the plasma including a plasma hot zone having a temperature sufficiently high to melt hexagonal phase boron nitride; and (b) exposing precursor particles of boron nitride (BN) to the plasma, whereby boron nitride melts.

37. The method of claim 36, where the plasma is generated from plasma gas at a gas pressure of about 0.01–100 atmospheres.

38. The method of claim 36, wherein the plasma is generated from plasma gas at a pressure of about 1 atmosphere.

39. The method of claim 36, wherein the plasma is generated by a DC discharge.

40. The method of claim 36, wherein the plasma is generated by supplying electromagnetic energy to the plasma gas.

41. The method of claim 36, wherein the plasma is generated using radiofrequency energy.

42. The method of claim 36, wherein the plasma is generated using microwave energy.

43. The method of claim 36, wherein the plasma is generated using about 100–30,000 watts of microwave power.

44. The method of claim 36, wherein the plasma is generated using about 300–1200 watts of power.

45. The method of claim 36, wherein the plasma comprising nitrogen atoms is generated by first producing an argon plasma from argon plasma gas and then introducing nitrogen plasma gas into the argon plasma.

46. The method of claim 36, wherein the plasma gas comprising nitrogen atoms is produced from a plasma gas stream mixture comprising about 95–0% argon gas and about 5–100% nitrogen gas.

47. The method of claim 36, wherein the precursor boron nitride comprises particles in the hexagonal solid phase.

48. The method of claim 36, wherein the precursor boron nitride particles are platelet-shaped.

49. The method of claim 36, wherein the precursor boron nitride particles comprise spherical particles.

50. The method of claim 36, wherein the precursor boron nitride particles comprise agglomerates.

51. Crystalline or partially crystalline boron nitride (BN) particles made by the process comprising the steps of:

(a) generating an aerosol comprising precursor particles of boron nitride (BN) suspended in an aerosol gas;

(b) generating a plasma from a plasma gas, the plasma comprising nitrogen atoms, the plasma including a plasma hot zone having a temperature sufficiently high to melt boron nitride;

(c) directing the directing the aerosol into the plasma hot zone and allowing the precursor particles of boron nitride to melt; and (d) allowing the molten particles to exit the hot zone, whereby they cool and solidify to form crystalline or partially crystalline solid particles of boron nitride.

52. The crystalline or partially crystalline boron nitride (BN) particles of claim 51, where the plasma is generated from plasma gas at a gas pressure of about 0.01–100 atmospheres.

53. The crystalline or partially crystalline boron nitride (BN) particles of claim 52, wherein the plasma is generated from plasma gas at a pressure of about 1 atmosphere.

54. The crystalline or partially crystalline boron nitride (BN) particles of claim 51, wherein the plasma is generated by a DC discharge.

55. The crystalline or partially crystalline boron nitride (BN) particles of claim 51, wherein the plasma is generated by supplying electromagnetic energy to the plasma gas.

56. The crystalline or partially crystalline boron nitride (BN) particles of claim 51, wherein the plasma is generated using radiofrequency energy.

57. The crystalline or partially crystalline boron nitride (BN) particles of claim 51, wherein the plasma is generated using microwave energy.

58. The crystalline or partially crystalline boron nitride (BN) particles of claim 57, wherein the plasma is generated using about 100–30,000 watts of microwave power.

59. The crystalline or partially crystalline boron nitride (BN) particles of claim 58, wherein the plasma is generated using about 300–1200 watts of power.

60. The crystalline or partially crystalline boron nitride (BN) particles of claim 51, wherein the plasma comprising nitrogen atoms is generated by first producing an argon plasma from argon plasma gas and then introducing nitrogen plasma gas into the argon plasma.

61. The crystalline or partially crystalline boron nitride (BN) particles of claim 51, wherein the plasma gas comprising nitrogen atoms is produced from a plasma gas stream mixture comprising about 95–0% argon gas and about 5–100% nitrogen gas.

62. The crystalline or partially crystalline boron nitride (BN) particles of claim 51, wherein the precursor boron nitride particles are in the hexagonal solid phase.

63. The crystalline or partially crystalline boron nitride (BN) particles of claim 51, wherein the precursor boron nitride particles are platelet-shaped.

64. The crystalline or partially crystalline boron nitride (BN) particles of claim 51, wherein the precursor boron nitride particles comprise spherical particles.

65. The crystalline or partially crystalline boron nitride (BN) particles of claim 51, wherein the precursor boron nitride particles comprise agglomerates.

66. The crystalline or partially crystalline boron nitride (BN) particles of claim 51, wherein the solid particles recovered in step (d) comprise spherical shaped particles with a diameter of about 1–1000 microns.

67. The crystalline boron nitride (BN) particles of claim 51, wherein the solid particles recovered in step (d) comprise polyhedral shaped particles.

68. Crystalline or partially crystalline boron nitride particles made by the method comprising the steps of:

(a) generating an aerosol comprising precursor particles of boron nitride suspended in an aerosol gas;

(b) generating a plasma from a plasma gas, the plasma comprising nitrogen atoms, the plasma including a plasma hot zone having a temperature sufficiently high to melt boron nitride but not high enough to decompose the boron nitride;

(c) directing the aerosol into the plasma hot zone and allowing the precursor particles of boron nitride to melt, collide, and join to form larger particles; and (d) allowing the molten particles to exit the hot zone, whereby they cool and solidify to form crystalline or partially crystalline solid particles of boron nitride that are larger than the precursor particles.

69. The crystalline or partially crystalline boron nitride particles of claim 68, wherein the plasma is generated from plasma gas at a gas pressure of about 0.01–100 atmospheres.

70. The crystalline or partially crystalline boron nitride particles of claim 68, wherein the plasma is generated from plasma gas at a pressure of about 1 atmosphere.

71. The crystalline or partially crystalline boron nitride particles of claim 68, wherein the plasma is generated by a DC discharge.

72. The crystalline or partially crystalline boron nitride particles of claim 68, wherein the plasma is generated by supplying electromagnetic energy to the plasma gas.

73. The crystalline or partially crystalline boron nitride particles of claim 68, wherein the plasma is generated using radiofrequency energy.

74. The crystalline or partially crystalline boron nitride particles of claim 68, wherein the plasma is generated using microwave energy.

75. The crystalline or partially crystalline boron nitride particles of claim 74, wherein the plasma is generated using about 300–30,000 watts of microwave power.

76. The crystalline or partially crystalline boron nitride particles of claim 75, wherein the plasma is generated using about 300–1200 watts of power.

77. The crystalline or partially crystalline boron nitride particles of claim 68, wherein the plasma comprising nitrogen atoms is generated by first producing an argon plasma from argon plasma gas and then introducing nitrogen plasma gas into the argon plasma.

78. The crystalline or partially crystalline boron nitride particles of claim 68, wherein the plasma gas comprising nitrogen atoms is produced from a plasma gas stream mixture comprising about 95–0% argon gas and about 5–100% nitrogen gas.

79. The crystalline or partially crystalline boron nitride particles of claim 68, wherein the precursor boron nitride particles are in the hexagonal solid phase.

80. The crystalline or partially crystalline boron nitride particles of claim 68, wherein the precursor boron nitride particles are platelet-shaped.

81. The crystalline or partially crystalline boron nitride particles of claim 68, wherein the precursor boron nitride particles comprise spherical particles.

82. The crystalline or partially crystalline boron nitride particles of claim 68, wherein the precursor boron nitride particles comprise agglomerates.

83. The crystalline or partially crystalline boron nitride particles of claim 68, wherein the solid particles recovered in step (d) comprise spherical shaped particles with a diameter of about 10–100 microns.

84. The crystalline or partially crystalline boron nitride particles of claim 68, wherein the solid particles recovered in step (d) comprise polyhedral shaped particles.

85. The crystalline or partially crystalline boron nitride particles of claim 68, wherein the solid particles recovered in step (d) comprises not-fully-dense agglomerates that arise from the incomplete melting of at least two partially melted, joined, precursor BN particles.

* * * * *